(No Model.)
J. J. SHEEHY.
CLOTHES POUNDER.
No. 523,601. Patented July 24, 1894.
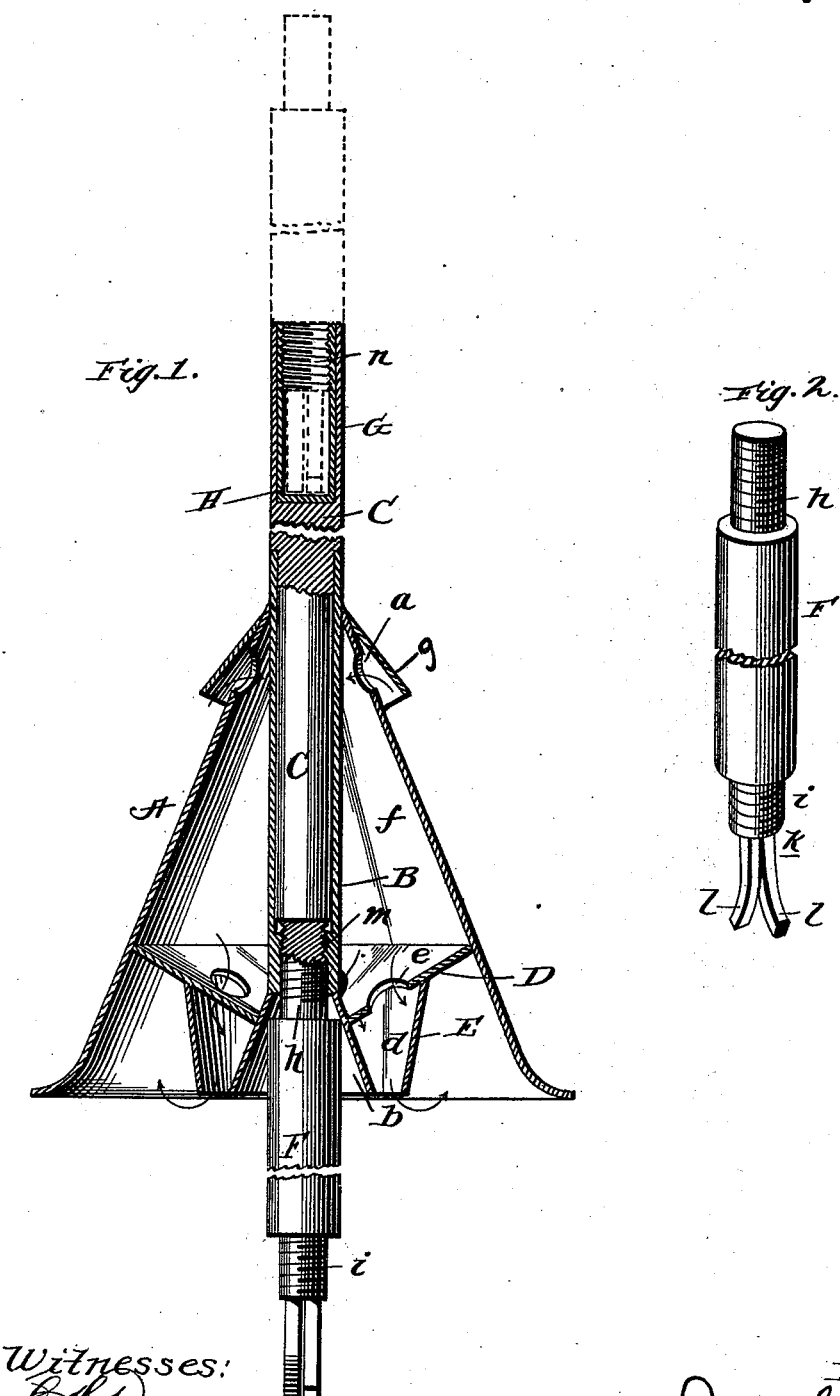
Witnesses:
Inventor
James J Sheehy

UNITED STATES PATENT OFFICE.

JAMES J. SHEEHY, OF WASHINGTON, DISTRICT OF COLUMBIA.

CLOTHES-POUNDER.

SPECIFICATION forming part of Letters Patent No. 523,601, dated July 24, 1894.

Application filed April 25, 1894. Serial No. 509,019. (No model.)

*To all whom it may concern:*

Be it known that I, JAMES J. SHEEHY, a citizen of the United States, residing at Washington, in the District of Columbia, have invented certain new and useful Improvements in Clothes-Pounders; and I do declare the following to be a full, clear, and exact description of the invention, such as will enable others skilled in the art to which it appertains to make and use the same.

This invention has relation to improvements on that class of clothes pounders, disclosed in the Letters Patent granted to Hill and Crooker, January 12, 1886, No. 334,379, and it has for its object to improve such devices by providing the same with a cheap and effective means of handling the hot clothes in the boiler or vessel, and to adapt such means for use as a handle when the device is used as a pounder.

The invention will be fully understood from the following description and claim when taken in connection with the annexed drawings, in which—

Figure 1, is a vertical central sectional view of the pounder illustrating my improvements partly in section and partly in elevation, and Fig. 2, is a perspective view of the combined handle and clothes stick removed.

Referring by letter to said drawings:—A, indicates the outer casing of the pounder head. This casing which may be of sheet metal, is of approximately cone shape, having its lower edge slightly flared as shown, and at a suitable distance from its upper end, are holes or apertures $a$. In the center of this conical head or casing is a tube B, which is designed to form a socket to receive the lower end of the handle C, and at the lower end of this central tube is a funnel or conical shaped cup $b$, which extends to a point or plane nearly the same as the lower edge of the casing A.

D, indicates a conical plate. This plate surrounds the cup $b$, with its lower edge bearing against the outer walls thereof, and its upper or enlarged end bears against the inner walls of the casing A, as shown. Depending from the concave plate D, is a rim or flange E, which converges or inclines slightly inward as shown and terminates in the same horizontal plane as the funnel or conical shaped cup, as shown, so as to form a chamber $d$, between said cup and the concave plate D. The concave plate D, is provided at suitable points in a circular manner, and above the chamber $d$, with holes or apertures $e$, so as to form a communication between this chamber $d$, and an air chamber $f$, formed above the concave plate D, and by the co-operation therewith of the central tube B, and the tapering walls of the casing A, the holes or apertures $a$, forming outlets at the upper end of the air chamber $f$, and these outlets are covered by semi-circular shields $g$, which incline downwardly a sufficient distance below said openings so as to prevent the water from squirting upwardly when the device has been plunged into the water and upon the clothes.

F, indicates an extension handle which is designed to serve the additional function of a clothes stick or fork. This handle is provided at its upper end with a reduced and threaded portion $h$, and at its lower end with a reduced and threaded portion $i$, and from this latter threaded portion, it is further reduced as shown at $k$, and thence shaped into tines or curved branches $l$. In the illustration, one of the tines is curved forwardly and the other rearwardly, or in opposite directions so as to serve more effectively in taking up the clothes. The lower end of the tube B, is internally screw tapped or threaded as shown at $m$, to receive the reduced and screw threaded end $h$, of the extension handle F, when the device is used as a clothes stick or fork. The upper end of the permanent handle C, is provided with a socket and this socket is designed to receive the fork and be engaged by the screw threaded portion $i$, of the supplemental handle F, when the device is used as a pounder. I have shown the socket G, of the handle C, as provided with a thimble H, which may be suitably secured in the socket of the handle, and this thimble is internally screw threaded as shown at $n$, to receive the threads $i$, of the extension handle; the socket being sufficiently deep to receive within it the forked branch $k$. By this construction it will be seen that I have a handle which serves the additional function of a clothes stick, thereby producing the device at a comparatively small expense. When it is desired to use the fork or stick, it is simply necessary to unscrew the handle section F, from the main section, and turn the threaded end $h$, into the lower threaded end of the tube, when it will project centrally from the head or body and a sufficient distance therefrom to conveniently handle the hot clothes; the whole being produced at a comparatively small expense and will be found very effective both for the purpose of a handle and a clothes stick or fork.

Having described my invention, what I claim is—

A clothes pounder, substantially as described, having the central tube screw tapped at its lower end, and the handle arranged in said tube and screw tapped at its upper end, in combination with the extension handle, having the threads at opposite ends and a fork at one of the threaded ends and adapted to be alternately placed in the handle and in the lower end of the tube to serve the two fold functions of a clothes stick and an extension handle for the pounder, substantially as specified.

In testimony whereof I affix my signature in presence of two witnesses.

JAMES J. SHEEHY.

Witnesses:
J. FRED. KELLEY,
K. F. MATTHEWS.